United States Patent
Liskow et al.

(10) Patent No.: US 7,694,583 B2
(45) Date of Patent: Apr. 13, 2010

(54) GRIPPER GAGE ASSEMBLY

(75) Inventors: Karl J. Liskow, Ypsilanti, MI (US);
Paul A. Mueller, Farmington Hills, MI (US); David Hayes, Ypsilanti, MI (US);
Robert E. Darrow, Sterling Heights, MI (US); Jack Jenkins, Ann Arbor, MI (US)

(73) Assignee: Control Gaging, Inc., Ann Arbor, MI (US)

( * ) Notice: Subject to any disclaimer, the term of this patent is extended or adjusted under 35 U.S.C. 154(b) by 0 days.

(21) Appl. No.: 11/417,591

(22) Filed: May 4, 2006

(65) Prior Publication Data

US 2006/0248960 A1    Nov. 9, 2006

Related U.S. Application Data

(60) Provisional application No. 60/677,906, filed on May 5, 2005.

(51) Int. Cl.
*G01N 3/02* (2006.01)
(52) U.S. Cl. ....................................................... 73/856
(58) Field of Classification Search ................... 73/856; 33/783
See application file for complete search history.

(56) References Cited

U.S. PATENT DOCUMENTS

| | | | |
|---|---|---|---|
| 2,717,449 A * | 9/1955 | Graham | 33/501.6 |
| 3,633,011 A * | 1/1972 | Bederman et al. | 700/192 |
| 3,694,970 A * | 10/1972 | Schoonover et al. | 451/5 |
| 3,747,741 A * | 7/1973 | Brems | 198/718 |
| 3,850,313 A | 11/1974 | Rackman et al. | |
| 3,881,436 A * | 5/1975 | Paumier et al. | 72/421 |
| 3,942,649 A * | 3/1976 | Hugelman et al. | 414/676 |
| 4,082,018 A | 4/1978 | Russell et al. | |
| 4,136,455 A * | 1/1979 | Owsen | 33/783 |
| 4,141,149 A | 2/1979 | George et al. | |
| 4,302,144 A | 11/1981 | Hallqvist | |
| 4,412,293 A | 10/1983 | Kelley et al. | |
| 4,462,585 A | 7/1984 | Gieson et al. | |
| 4,509,783 A | 4/1985 | Ioneseu | |
| 4,534,006 A | 8/1985 | Minucciani et al. | |
| H65 H | 5/1986 | Beni et al. | |
| 4,601,109 A * | 7/1986 | Klingler et al. | 33/517 |
| 4,611,296 A | 9/1986 | Niedermayr | |
| 4,611,846 A * | 9/1986 | Feiber et al. | 294/88 |
| 4,697,246 A * | 9/1987 | Zemke et al. | 702/128 |
| 4,727,471 A | 2/1988 | Driels et al. | |

(Continued)

FOREIGN PATENT DOCUMENTS

DE    3611312 A1    10/1987

(Continued)

*Primary Examiner*—Lisa M Caputo
*Assistant Examiner*—Octavia Davis
(74) *Attorney, Agent, or Firm*—Brinks Hofer Gilson & Lione (57) ABSTRACT

A gage and gripper assembly for directly measuring characteristics of a workpiece. The assembly is adapted to be attached to a transfer mechanism, such as a robot arm, and includes a head having a gripper and a gage. The gripper is adapted to lift and hold the workpiece using jaws or other mechanisms, and the gage is adapted to directly measure characteristics of the workpiece while the workpiece is held by the gripper.

26 Claims, 7 Drawing Sheets

U.S. PATENT DOCUMENTS

| | | | |
|---|---|---|---|
| 4,748,570 A | 5/1988 | Shochi et al. | |
| 4,753,532 A * | 6/1988 | Aldred | 356/635 |
| 4,795,299 A * | 1/1989 | Boys et al. | 414/217 |
| 4,813,732 A * | 3/1989 | Klem | 294/103.1 |
| 4,818,174 A | 4/1989 | Arpiarian et al. | |
| 4,832,543 A | 5/1989 | Negri et al. | |
| 4,852,237 A | 8/1989 | Tradt et al. | |
| 4,893,820 A | 1/1990 | Silverman | |
| 5,058,468 A | 10/1991 | Lessway | |
| 5,090,757 A | 2/1992 | Huber et al. | |
| 5,181,824 A * | 1/1993 | Thomas | 414/751.1 |
| 5,198,876 A | 3/1993 | Anezaki et al. | |
| 5,454,263 A | 10/1995 | Patzke et al. | |
| 5,585,568 A | 12/1996 | Moncrief et al. | |
| 5,788,453 A * | 8/1998 | Donde et al. | 414/744.5 |
| 5,802,201 A | 9/1998 | Nayer et al. | |
| 5,915,915 A | 6/1999 | Allen et al. | |
| 5,945,798 A | 8/1999 | Stagnitto et al. | |
| 6,095,317 A * | 8/2000 | Waldner et al. | 198/463.2 |
| 6,099,059 A | 8/2000 | Schultz et al. | |
| 6,176,532 B1 | 1/2001 | Degener | |
| 6,318,951 B1 * | 11/2001 | Schmidt et al. | 414/744.5 |
| 6,332,636 B1 | 12/2001 | Cohen et al. | |
| 6,453,214 B1 | 9/2002 | Bacchi et al. | |
| 6,503,046 B1 | 1/2003 | Salki et al. | |
| 6,618,645 B2 | 9/2003 | Bacchi et al. | |
| 6,691,860 B2 | 2/2004 | Osterfeld et al. | |
| 6,692,049 B2 | 2/2004 | Holbrooks | |
| 6,742,273 B2 * | 6/2004 | Nagatsuka et al. | 33/549 |
| 6,874,834 B2 * | 4/2005 | McIntosh et al. | 294/88 |
| 7,059,817 B2 * | 6/2006 | Sieradzki et al. | 414/217 |
| 7,390,458 B2 * | 6/2008 | Burow et al. | 422/63 |
| 2002/0171254 A1 | 11/2002 | Mccormick | |
| 2003/0180137 A1 | 9/2003 | Schuster | |
| 2004/1008029 | 4/2004 | Nihel et al. | |
| 2004/0261550 A1 | 12/2004 | Asa | |
| 2004/0285110 | 12/2004 | Schnoor et al. | |

FOREIGN PATENT DOCUMENTS

| | | |
|---|---|---|
| EP | 0595168 | 5/1994 |
| JP | 59-88601 | 5/1984 |
| JP | 63-91593 | 4/1988 |

* cited by examiner

GRIPPER GAGE ASSEMBLY

CROSS-REFERENCE TO RELATED APPLICATION

This application claims the benefit of provisional application entitled "GAGE GRIPPER ASSEMBLY" (Ser. No. 60/677,906) filed on May 5, 2005.

BACKGROUND

1. Field of the Invention

The present invention generally relates to the measuring of workpieces, and more particularly the handling and measuring of such workpieces.

2. Description of Related Art

Generally, cylindrical workpieces, or workpieces having cylindrical portions, are turned, bored, milled, ground, polished, extruded or otherwise subject to a material forming operation at a processing station ("machine tool station") to a desired diameter. Before releasing the workpiece for subsequent assembly in an article of manufacture, the workpiece is gaged to determine if the diameter (inner or outer) or other dimension (e.g. length of the workpiece) is within acceptable tolerances.

Several methods are known for this gaging. Gaging may be conducted "in-process", while turning, grinding or polishing is occurring. An alternative method involves removing the workpiece from the machine tool station and fixturing it in a gaging station. In the gaging station, a gage engages the workpiece and measures the dimension of interest. If the workpiece is within acceptable tolerances, the workpiece is removed from the gaging station, accepted and transferred to another station for further working, subsequent assembly into the article of manufacture or further transfer. Another method of gaging the workpiece involves gaging the workpiece while it is in the machine tool station. To achieve this, machining is halted and a gage reading taken. A disadvantage of the latter method is the length of time in the production cycle required to perform the gaging operation.

In view of the above, it is apparent that, in cases where in process gaging is impractical or impossible, there exists a need for a gaging assembly and method that perform the gaging function while reducing or minimizing its effect on the overall production cycle.

SUMMARY

In satisfying the above need, as well as overcoming the enumerated drawbacks and other limitations of the related art, the present invention provides an assembly and method that performs the gaging function while eliminating the effect of the gaging step on the length of the overall production cycle.

In achieving the above, an assembly embodying the principles of the present invention incorporates a gage and gripper assembly, together in an end effector that is to be attached to the wrist or other portion of a robotic arm. The robotic arm itself may be of a fixed position base variety or a moveable gantry-type variety. With the present invention, gaging occurs at a point in time between the gripping of the workpiece, such as during initial pick up of the unmachined workpiece or removal of a machined workpiece from the machine tool station, and the next release of the workpiece from the assembly at the next station in the production process. As used herein, during this time period the workpiece is defined as being in-transit. Thus, gaging may take place while the workpiece is gripped by the assembly, but stationary, moving at a constant velocity, moving under acceleration or moving under deceleration by the assembly between stations. Additionally, gaging is done as a direct measurement of the workpiece.

Further objects, features and advantages of this invention will become readily apparent to persons skilled in the art after a review of the following description, with reference to the drawings and claims that are appended to and form a part of this specification.

DETAILED DESCRIPTION

Figure 1:
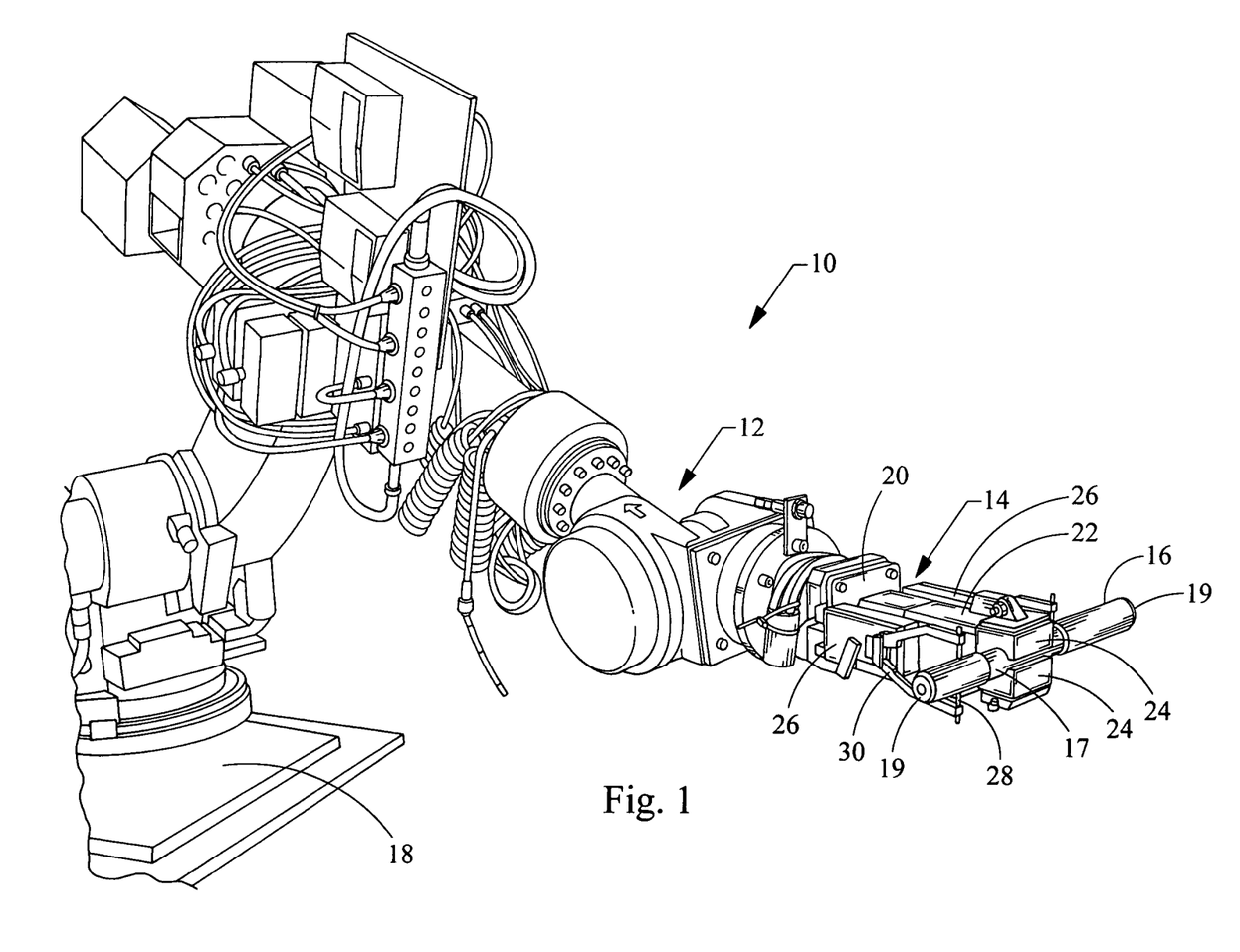
FIG. 1 is a perspective view of a robotic arm and a gage and gripper assembly.

Referring now to FIG. 1, a gage and gripper assembly embodying the principles of the present invention is illustrated therein and designated at 10. As its primary components, the gage and gripper assembly 10 includes a transfer mechanism 12 and a gripper head 14. While the transfer mechanism may be any one of a wide variety of mechanisms that transfer a workpiece from one location to another as mentioned above, as illustrated herein (without intending to limit the claims) the transfer mechanism 12 is a floor mounted robot or robotic arm. The arm is capable of lifting a workpiece 16, using the gripper head 14, from a machine tool station (not shown) and delivering the workpiece 16 to the next tool station (not shown) by pivoting around a footing 18. Alternatively, the transfer mechanism 12 could be a gantry system wherein the whole mechanism 12 moves along a production line. Unlike the robotic arm, the gantry may move linearly and vertically. This allows the gantry to vertically lift the workpiece 16, using the gripper head 14, from the machine tool station, and translate linearly to the next machine tool station. As one skilled in the art will appreciate, the robotic arm and gantry system are but two examples of mechanism 12 capable of moving the workpiece 16 from one machine tool station to another. For example, a robotic arm itself may be mounted to a gantry system or a mere pick and place type system may be employed.

Figure 2:
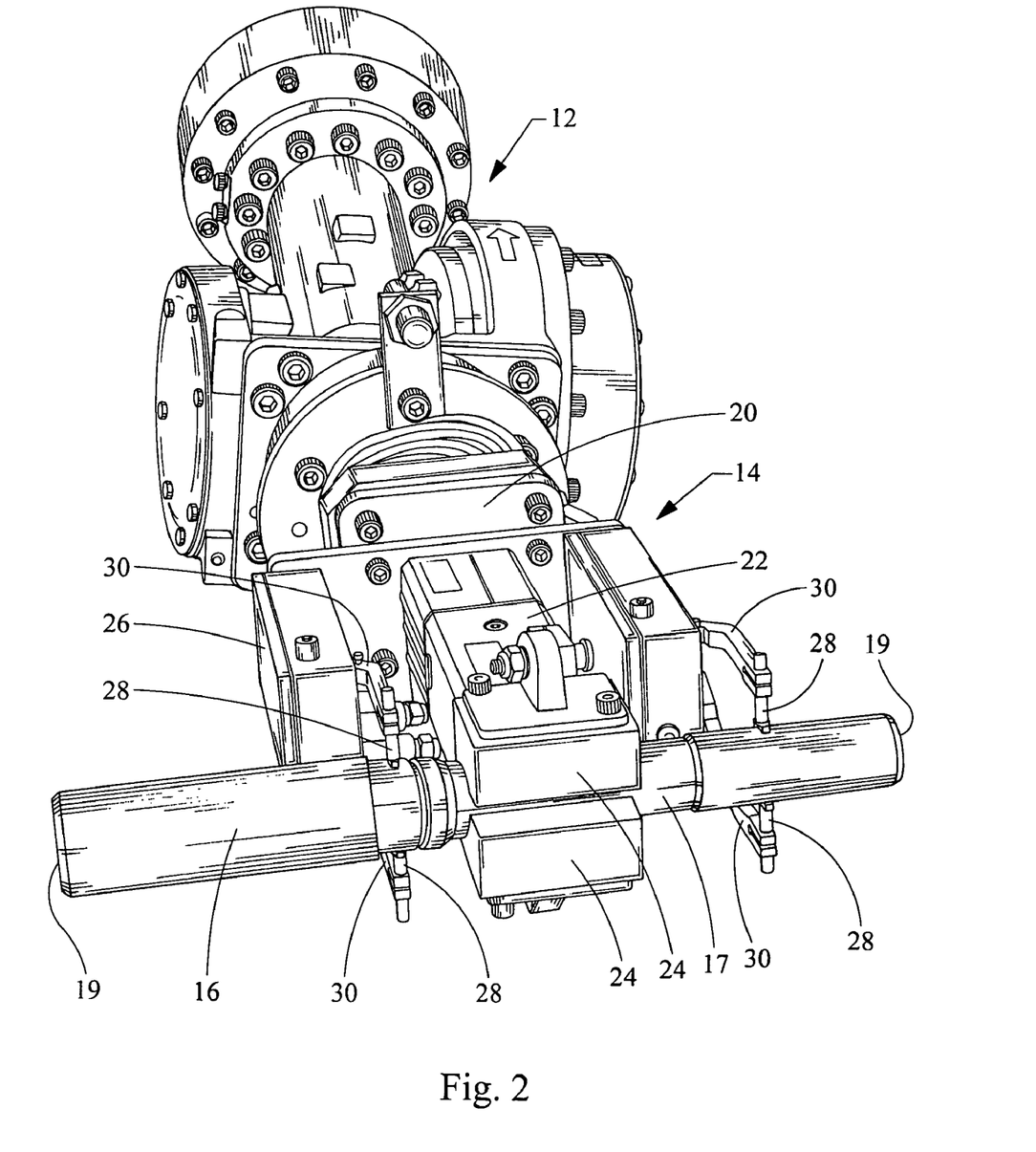
FIG. 2 is a close-up view of the gage and gripper assembly on the robotic arm.

Turning now to FIG. 2, the gripper head 14 on the end of the mechanism 12 is shown in more detail. As its primary components, the gripper head 14 includes a base 20, a gripper 22, having one or more gripper jaw(s) 24, and at least one gage 26. The base carries the gripper 22, gripper jaw(s) 24 and the gage 26 and further attaches the gripper head 14 to the robotic arm. The gripper jaw(s) 24 open and close (pneumatically, electrically, hydraulically or otherwise) to engage and pickup the workpiece 16 and, in conjunction with movement of the robotic arm, move the workpiece from the first machine tool station to the next station. The next station may include any station involved in the production of the workpiece 16 or the resultant article of manufacture. Such stations may include, without limitation, any of the above mentioned machining stations, an ejection station (acceptance or rejection), an assembly station, a transfer station or a further processing station.

The gripper jaw(s) 24 engage the workpiece 16 at one or more places and operate to locate the workpiece relative to the gage 26. As used herein referring to the gripper 22, the term "gripper" is meant to include the terminal mechanism of an apparatus that engages and holds the workpiece 16 as the workpiece 16 is transferred between stations. While illustrated as an embodiment of a mechanical gripper employing a pair of generally opposed jaws, the present invention is not intended to be limited by the illustrated embodiments. It will be appreciated that the gripper may take any one of many forms and types, including, without limitation, gripping means employing mechanical, electromechanical, electrical, vacuum, magnetic or other principles, or combinations of these. In some embodiments, the gripper jaw(s) 24 may engage a center portion 17 of the workpiece 16, as shown in FIGS. 1 and 2, or alternately may engage any other portion of the workpiece 16. For example, the gripper jaw(s) 24 may include two separate elements that engage and hold the workpiece 16 on end portions 19 running transverse to the center portion 17. Accordingly, the gripper 22 may grip the workpiece 16 on an outer diameter, an inner diameter, between ends or sides of a workpiece and, depending on the shape of the workpiece (a shaft-type workpiece, a round-type workpiece, or a housing-type (rectangular or other shape) workpiece) measure an outer diameter, an inner diameter, length or width of the workpiece or a portion thereof. The gripper 22 and its associated components, the gripper jaw(s) 24, may be of a construction that is well known by those of ordinary skill in the art. One such representative gripper 22 is illustrated in FIGS. 2a and 2b.

Figure 2A:
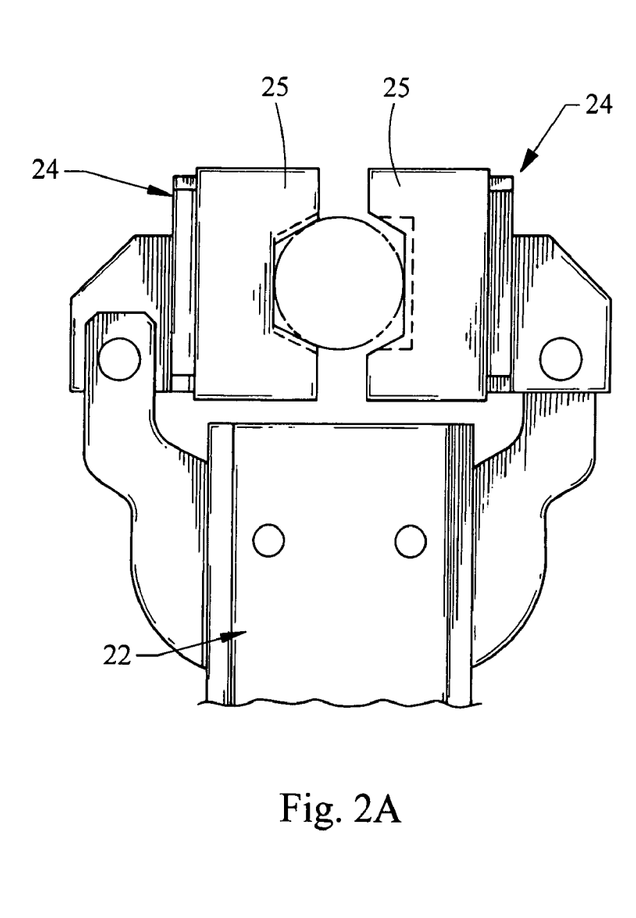
FIGS. 2a and 2b are side and perspective views of a gripper jaw and tooling construction.
Figure 2B:
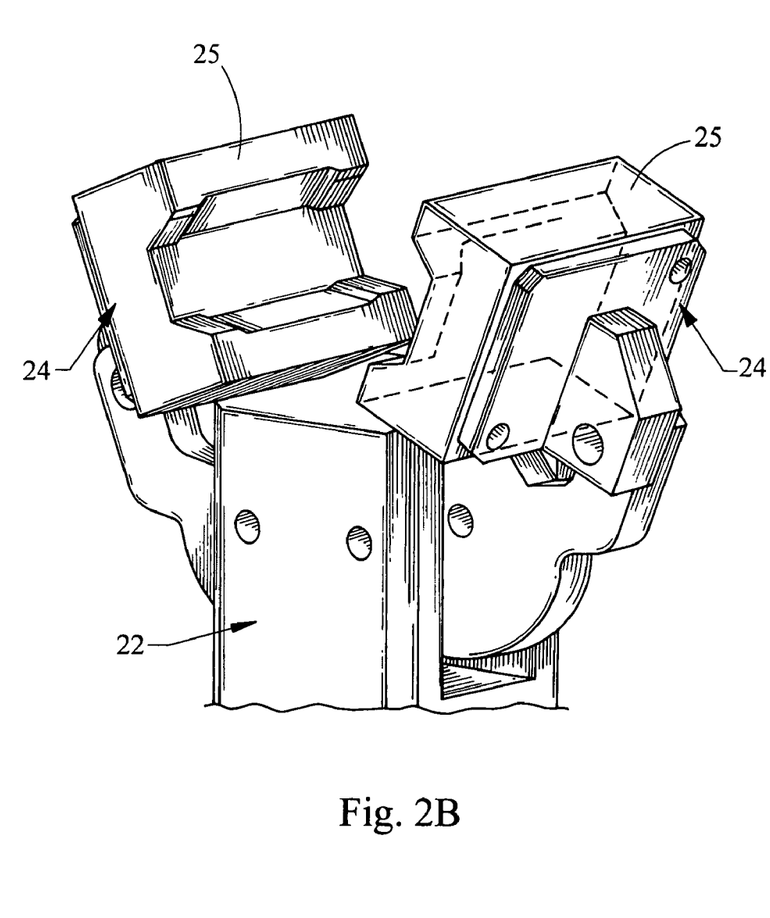

Referring to FIGS. 2a and 2b, in order for a gripper 22 to properly gage a workpiece during part transfer by the gripper 22, the gripper 22 must have a high degree of repeatability when holding the workpiece. Some of this requirement is met by the gripper design inherently, but part of the requirement must be met by appropriate jaw (tooling) design. A common method of picking up a cylindrical workpiece is with a gripper 22 possessing two opposing jaws 24 that rotate or slide towards each other. In so doing, the tooling at the end of the jaws 24 surrounds the workpiece and applies a prevailing clamping force at which time the workpiece may be transferred (and gaged). In FIG. 2a, the design of the tooling 25 at the end of a pair of gripper jaws 22 of the type described is shown. Of particular interest is the geometry of this tooling 25. When the jaws 24 close on the workpiece, only the contact positions identified at 3, 7, and 11 contact the workpiece at a section along the workpiece. These three positions effectively constrain this section of the workpiece. Similarly, contact positions 3', 7', and 11' constrain a section of the workpiece physically separated from the first by the length of the jaw tooling 25. In this manner, the workpiece is fully constrained.

In one version of this tooling design, the material selected for the tooling is somewhat elastic. This allows the contact positions 3, 3', 7, 7', 11, and 11' to slightly compress during gripping. A suitable choice of this elastic property further aids in assuring that all six positions 3, 3', 7, 7', 11, and 11' contact the workpiece with balanced force between the two ends of the tooling 25. Manufacturability is enhanced due to elimination of the requirement that the geometry of each end be held to a high tolerance, as would be the case with a more rigid material.

Clearly this three position gripping construction may be shared between two grippers 22 for a long workpiece. In such a case, the first gripper would contain tooling resembling only the left side of the tooling 25 shown in FIG. 2b and would contact the workpiece at positions 3, 7, and 11. The second gripper would contain tooling resembling the right end of the tooling 25 shown in FIG. 2b and would contact the workpiece at positions 3', 7', and 11'. The gripping locations may be physically separated along the workpiece by whatever distance is required to suitably constrain the workpiece.

Turning to the gage 26, it may be provided on the base 20 as an individual component, separate and distinct from the gripper jaw(s) 24 and its associated components. Additionally, more than one gage 26 may be included in the gage and gripper assembly 14 and located, relative to the workpiece 16, axially between, or outside (or both) of, two sets of gripper jaw(s) 24.

The gage 26 may be any of a variety whose construction is well known by those of ordinary skill in the art. The gage 26 shown in FIGS. 1 and 2 has one or more contacts 28 and takes the form of what is referred to herein as a "jump-on" gage 26. However, the gripper head 14 may have any other type of gage, such as other finger-type gages, snap gage or a chordal gage. While the gage 26 is often of the type mentioned above, where dimensions are measured directly, different gages may be used to examine other characteristics. For example, an eddy current gage may be incorporated to check for the presence of cracks. As will be appreciated by those skilled in the art, other numerous gaging methods may be employed in the present invention, including (without limitation) air gages, optical (including laser) gages, capacitance gages and others.

Figure 3:
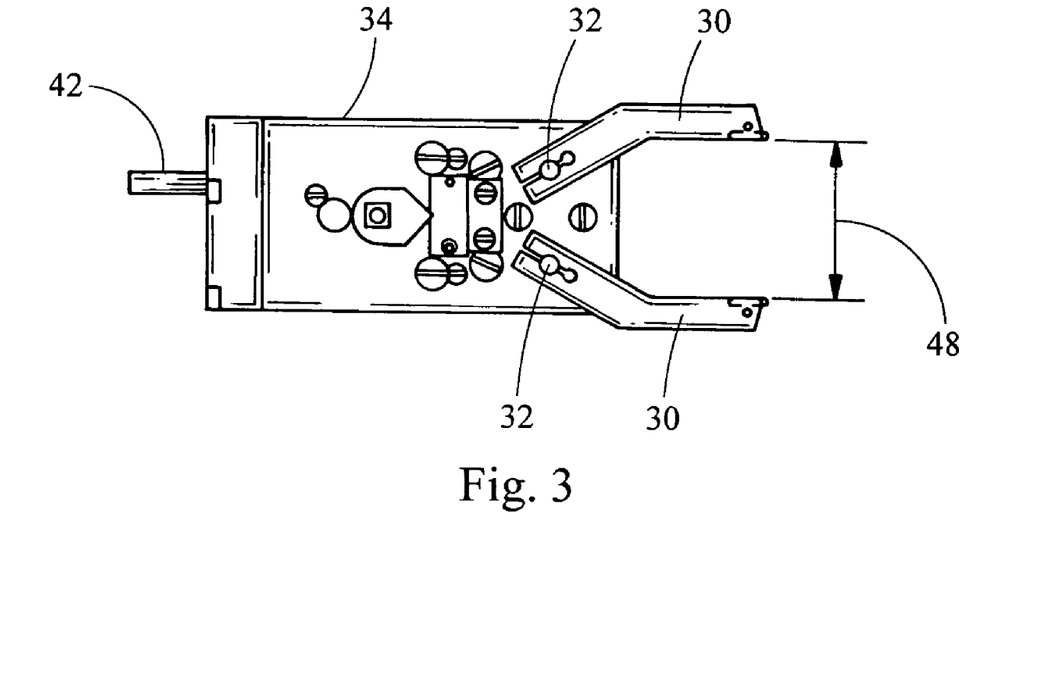
FIG. 3 is a side view of a "jump-on" gage.
Figure 4:
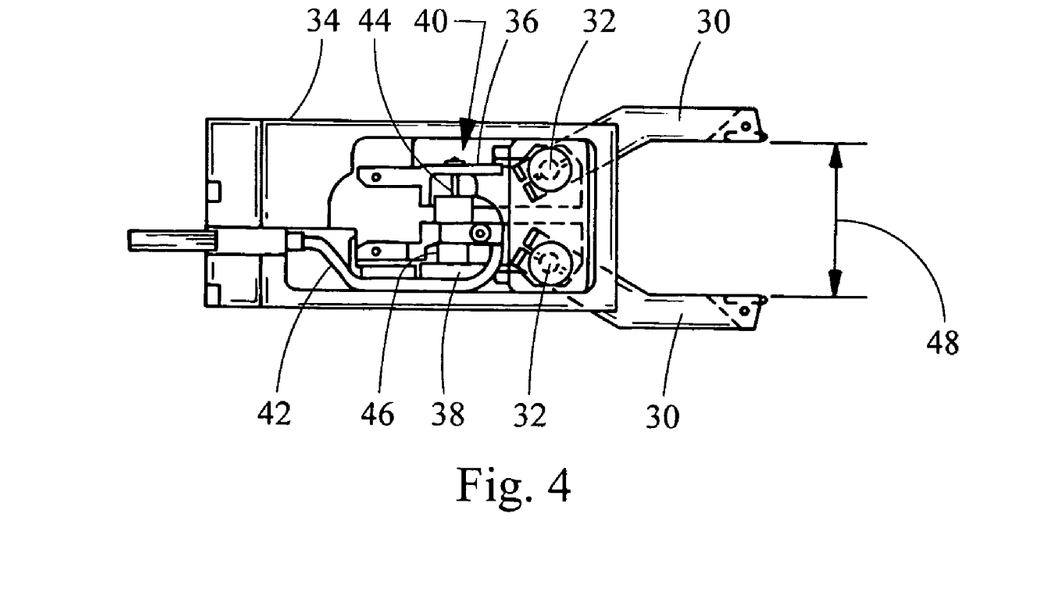
FIG. 4 is a side view of a "jump-on" gage with a cover removed.

FIG. 3 shows the gage 26 in more detail. As its primary components, the gage 26 has one or more pivot fingers or arms 30 attached through a pivot axis 32 to a gage housing 34. As shown in FIG. 4, each pivot arm 32 is respectively coupled to an upper internal pivot arm 36 and a lower internal pivot arm 38. The internal pivot arms 36, 38 are then coupled to a known type of position sensor 40, such as linear variable differential transformer (LVDT) having a core 44 and coils 46. In one example, the upper arm 36 is coupled to the core 44 and the lower arm 38 is coupled to the coils 46. The sensor 40 is then electrically connected to an output cable 42 that transmits a signal generated by the sensor 40 to a device (not shown) that converts the signal into a value corresponding to the displacement of the core 44 relative to the coils 46. This value is then added to a known neutral distance 48 to determine the corresponding diameter of the workpiece 16.

Figure 5:
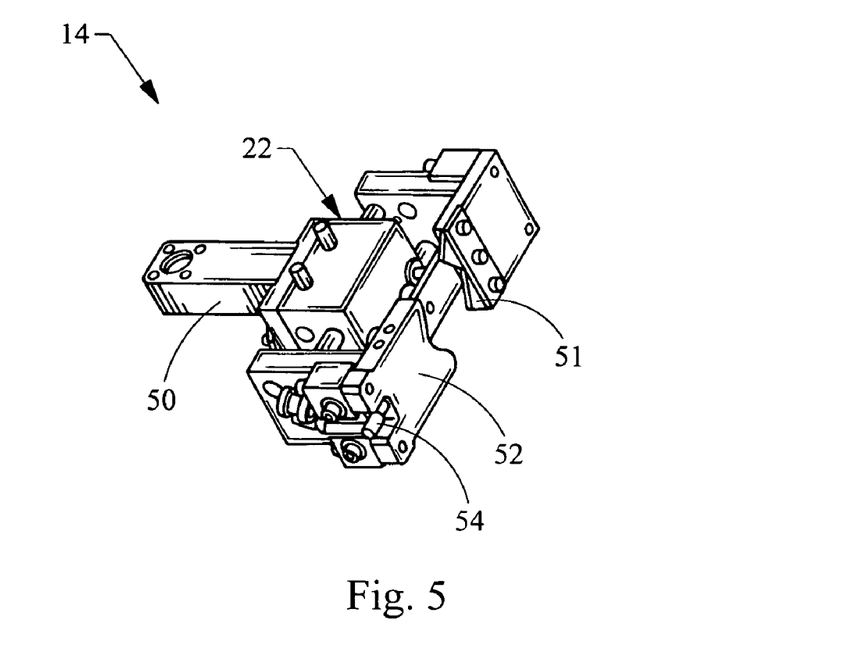
FIG. 5 is a perspective view of a gage integrated with a gripper.
Figure 6:
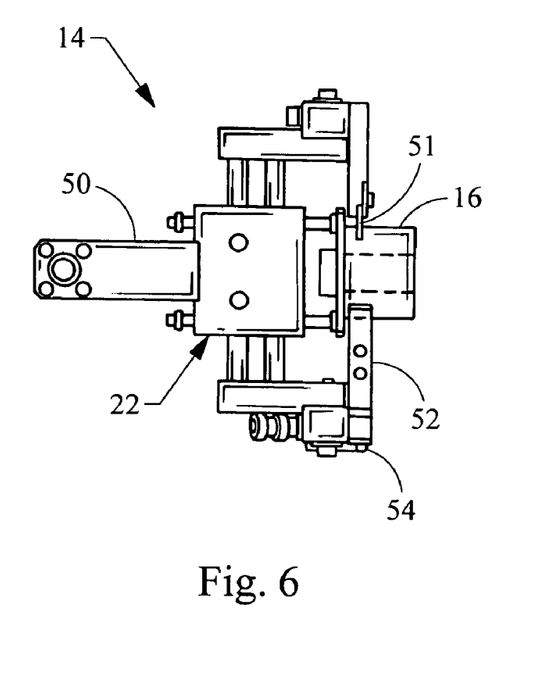
FIG. 6 is a side view of the gage integrated with the gripper.
Figure 7:
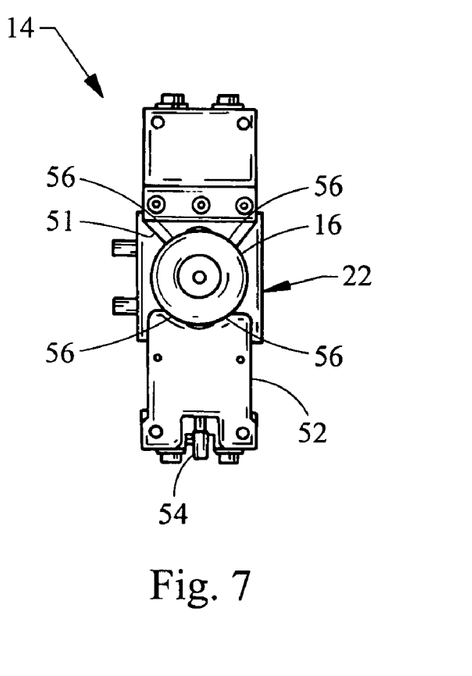
FIG. 7 is an end view of the gage integrated with the gripper.

In an alternative embodiment, shown in FIGS. 5, 6 and 7, the gage 26 is integrated with the construction of the gripper 22. As its primary components it comprises a mounting arm 50 to attach the gripper 22 to the base 20. The gripper 22 is composed of an alternative jaw 51, an opposing gage/jaw 52 and a probe 54. In this construction, the probe 54 is preferably located in the general plane of movement of the jaw 51. The probe 54 is mounted in the gage/jaw 52 so as to be moveable with respect to the gage/jaw 52 and generally biased toward the workpiece 16. In addition to the probe 54, this construction includes reference points 56 that contact the workpiece 16. Based on the displacement of the probe 54, and the contacting of the workpiece 16 at the reference points 56, a calculation of an accurate measurement of the workpiece can be achieved. In its preferred construction, the gage of this embodiment is accordingly of the chordal variety.

Figure 8:
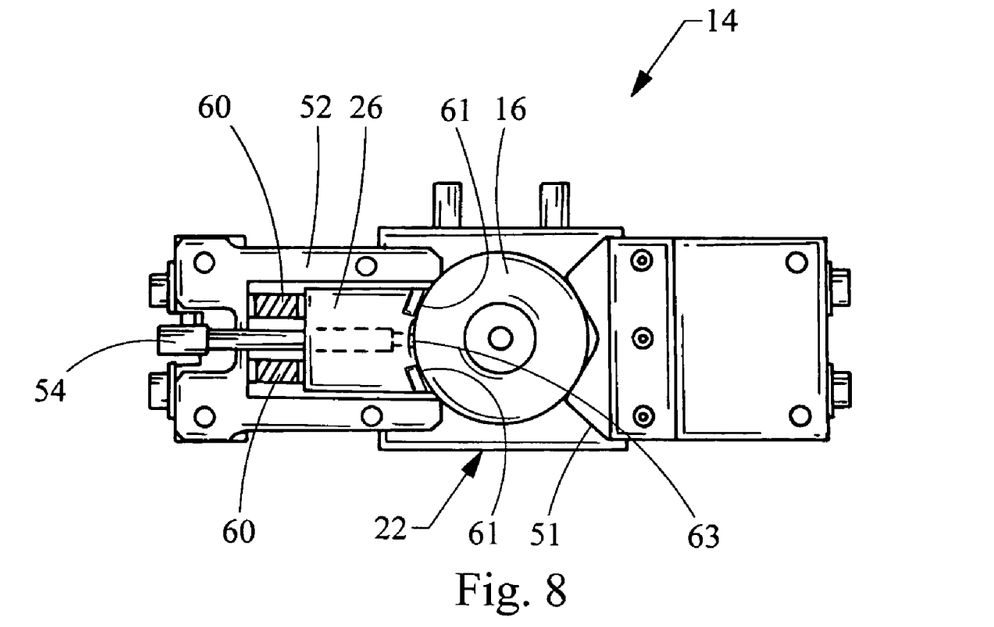
FIG. 8 is the gage and gripper of FIG. 6 with a cover removed from the gripper, displaying the gage.

As shown in FIG. 8, the chordal gage itself may be constructed to "float" with respect to the gage/jaw 52 and self-locate with respect to the workpiece 16. In the illustrated construction, the gage 26 is moveable within a recessed portion of a gage/jaw 52 and biased by an appropriate means, such as the spring 60 or other means. The gage 26 is provided with contacts 61 that have a configuration and orientation generally corresponding with the contact portions of the gage/jaw 52 that engage and hold the workpiece 16. Extending from the end of gage 26, within a recess between the contacts 61, is a probe tip 63. As the contacts 61 of the gage 26 contact the workpiece 16, the workpiece 16 displaces the probe tip 63. Since the angle between the surfaces of the contacts 61 is known, the amount of displacement of the probe tip 63 allows the diameter of the workpiece 16 to be determined. Via the biasing means 60, the gage 26 finds the workpiece 16 and determines its diameter, but does not participate in actual gripping of the workpiece 16.

Figure 9:
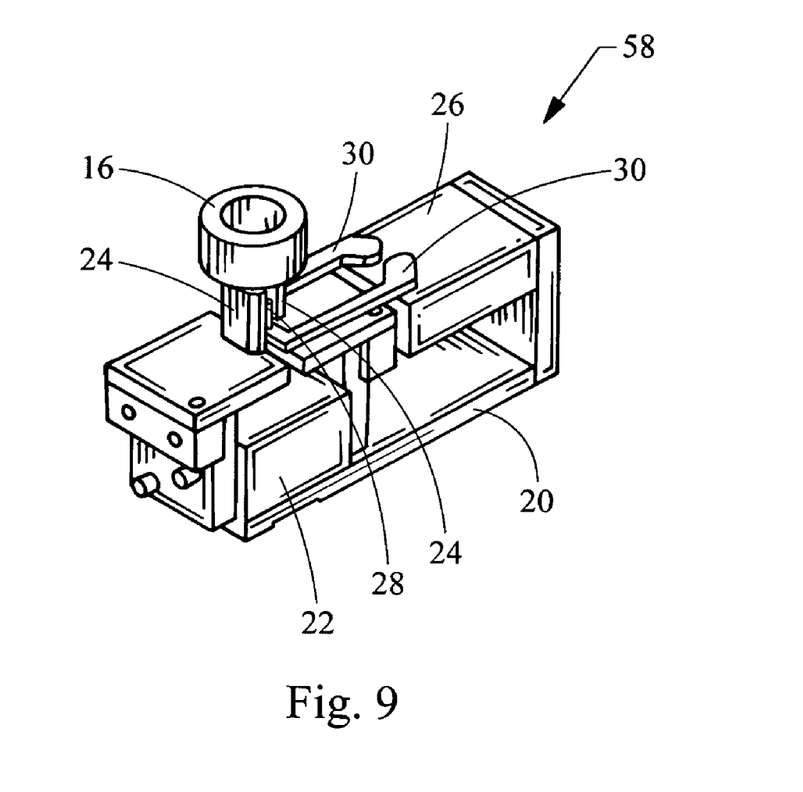
FIG. 9 is a perspective view of an internal diameter (ID) gage and gripper.
Figure 10:
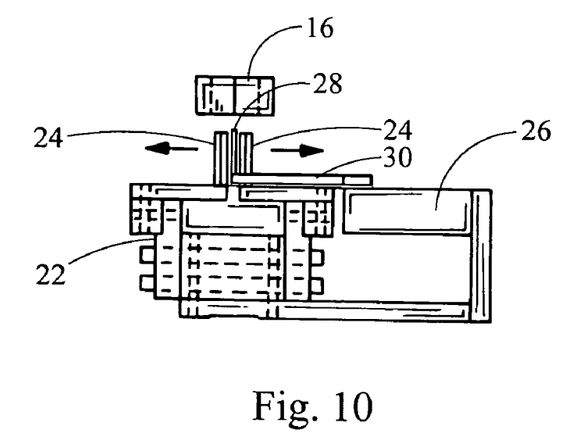
FIG. 10 is a side view of the ID gage and gripper.
Figure 11:
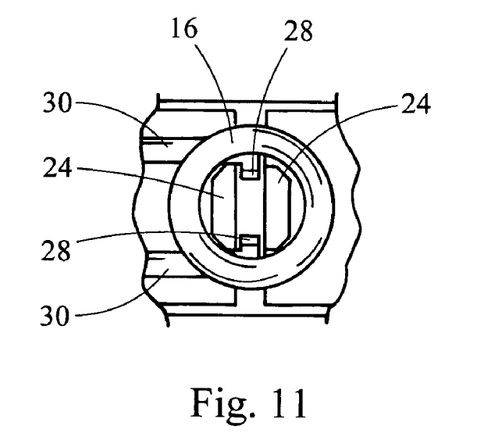
FIG. 11 is a close-up, top view of the ID gage and gripper before grasping and measuring a workpiece.

Another embodiment of the gripper head 14 is an inner diameter (ID) gage 58. The ID gage 58 (see FIG. 9) essentially comprises a different arrangement of the same components as the gripper head 14 illustrated in FIG. 1. While in a neutral or initial position, the gripper jaw(s) 24 of the gripper 22 and the contacts 28 of the gage 26 are arranged, as shown in FIG. 11, to fit inside the workpiece 16. In order to grab and hold the workpiece, the gripper jaw(s) 24 move outward (as shown by the arrows in FIG. 10), and engage the inside of the workpiece 16. While this is a preferred embodiment, other arrangements of the ID gage 58, wherein the gripper jaw(s) 24 hold the workpiece 16 from the outside (see FIG. 7), are also possible.

Figure 12:
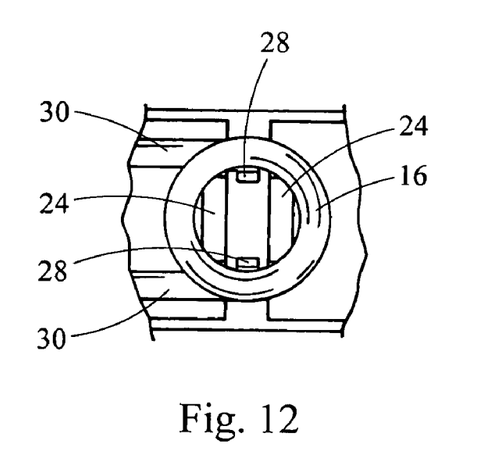
FIG. 12 is a close-up, top view of the ID gage and gripper while grasping and measuring the workpiece.

Once it is gripped by the gripper jaw(s) 24, the gage 26 may then measure the inside diameter of the workpiece 16. Using the same method described above for the LVDT 40, the pivot arms 30 actuate to move the contacts 28 outward until they engage the inside of the workpiece 16. A reading of the LVDT 40 is then taken and the inside diameter of the workpiece 16 is calculated. FIG. 12 shows the ID gage 58 taking a measurement wherein both the gripper jaw(s) 24 and the contacts 28 are in engagement with the workpiece 16.

Once the workpiece 16 has been gripped by the gripper jaws 24 and measured using the gage 26, the measured value may be compared to an expected value. Such comparison is usually done automatically by a controller, for example, a digital gage controller. If the measured value conforms with the expected value, the workpiece 16 is accepted and automatically moved on to the next work station by the transfer mechanism 12. If the measured value fails to conform with the expected value, the workpiece 16 may be rejected and the transfer mechanism 12 will, for example, return the workpiece 16 to the first station for rework or send it to a scrap station. Therefore, by automating the inspection process and incorporating it into the step of transferring the workpiece 16 from one work station to the next, the present invention reduces the number of process steps and significantly lowers overall process time. Based on the measured characteristic of the workpiece, size control adjustment signals may be sent to a metal cutting machine to adjust for needed corrections, wear of the tooling, etc.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A gage and gripper assembly of a transfer mechanism for directly measuring a dimension of a workpiece, the assembly comprising:
    a base having portions to attach the assembly to the transfer mechanism;
    a head supported by the base and moveable by the transfer mechanism between first and second stations, the head including a gripper and a gage,
    the gripper having portions actuatable to hold and secure the workpiece as the workpiece is moved by the transfer assembly between the first and second stations, the gripper being movable with the head between the first and second stations, and
    the gage positioned in the head and being movable with the head between the first and second stations, the gage being configured to directly measure a dimension of the workpiece while the workpiece is held by the gripper and in transit between the first and second stations, the dimension being one of a diameter of the workpiece, a length of the work and a width of the workpiece.

2. The gage and gripper assembly of claim 1 wherein the gage is adapted to measure an outside diameter of the workpiece.

3. The gage and gripper assembly of claim 1 wherein the gage is adapted to measure an inside diameter of the workpiece.

4. The gage and gripper assembly of claim 1 wherein the gage is adapted to measure a length of the workpiece.

5. The gage and gripper assembly of claim 1 wherein the gripper has at least one moveable jaw adapted to grip and hold the workpiece.

6. The gage and gripper assembly of claim 1 wherein the workpiece has a center portion and end portions transverse to the center portion and the gripper is adapted to engage the center portion of the workpiece.

7. The gage and gripper assembly of claim 6 wherein the gripper is adapted to engage the workpiece by the end portions.

8. The gage and gripper assembly of claim 6 wherein the gage is incorporated into the at least one moveable jaw.

9. The gage and gripper assembly of claim 6 wherein the gage is a chordal gage.

10. The gage and gripper assembly of claim 6 wherein the gage is mounted in the jaw and is moveable with respect to the jaw and is generally biased toward the workpiece.

11. The gage and gripper assembly of claim 10 wherein the bias is provided by a spring.

12. The gage and gripper assembly of claim 10 wherein the gage is adapted to engage and measure the workpiece while the workpiece is gripped by the gripper and being moved from a first work station to a second work station without acceleration.

13. The gage and gripper assembly of claim 10 wherein the gage is adapted to engage and measure the workpiece while the workpiece is gripped by the gripper and being moved from a first work station to a second work station under acceleration.

14. The gage and gripper assembly of claim 10 wherein the gage is adapted to engage and measure the workpiece while the workpiece is gripped by the gripper and being moved from a first work station to a second work station under deceleration.

15. A method of measuring a dimension of a workpiece, the method comprising:

lifting a workpiece from a first station using a gage and gripper assembly supported by a base on a transfer mechanism and moving the workpiece via the gage and gripper assembly to a next station while the workpiece is being held by the gage and gripper assembly;

measuring a dimension of the workpiece using a gage also carried with the gage and gripper assembly, the measuring step occurring while the workpiece is held by the gage and gripper assembly after being lifted at the first station and before arriving at the next station.

16. The method of measuring a dimension of a workpiece of claim 15 further comprising the step of comparing the measured value of the dimension with an expected value for the dimension.

17. The method of measuring a dimension of a workpiece of claim 15 further comprising in response to the comparison, rejecting the workpiece if the measured value fails to match the expected value and accepting the workpiece if the measured value conforms with the expected value.

18. The method of measuring a dimension of a workpiece of claim 17 the step of rejecting the workpiece includes the step of reworking the workpiece.

19. The method of measuring a dimension of a workpiece of claim 17 wherein the step of rejecting the workpiece includes delivering the workpiece to the second station which is a scrap station.

20. The method of measuring a dimension of a workpiece of claim 15 further comprising accepting the workpiece by moving it to a second work station using the transfer mechanism and further processing the workpiece at the second station.

21. The method of measuring a dimension of a workpiece of claim 15 wherein the step of measuring takes place while the workpiece is being moved to the second station.

22. The method of measuring a dimension of a workpiece of claim 21 wherein the step of measuring is performed while the workpiece is being moved and acceleration of the workpiece is substantially zero.

23. The method of measuring a dimension of a workpiece of claim 21 wherein the step of measuring is performed while the workpiece is being moved and is under acceleration.

24. The method of measuring a dimension of a workpiece of claim 21 wherein the step of measuring is performed while the workpiece is being moved and under deceleration.

25. The method of measuring a dimension of a workpiece of claim 15 wherein the step of measuring takes place while the workpiece is stationary.

26. The method of claim 15 further comprising the step of sending size control adjustment signals to a metal cutting machine based on the measured dimension.

* * * * *